(No Model.)
W. HARRIS.
BREAD AND PASTRY BOARD.
No. 599,447. Patented Feb. 22, 1898.
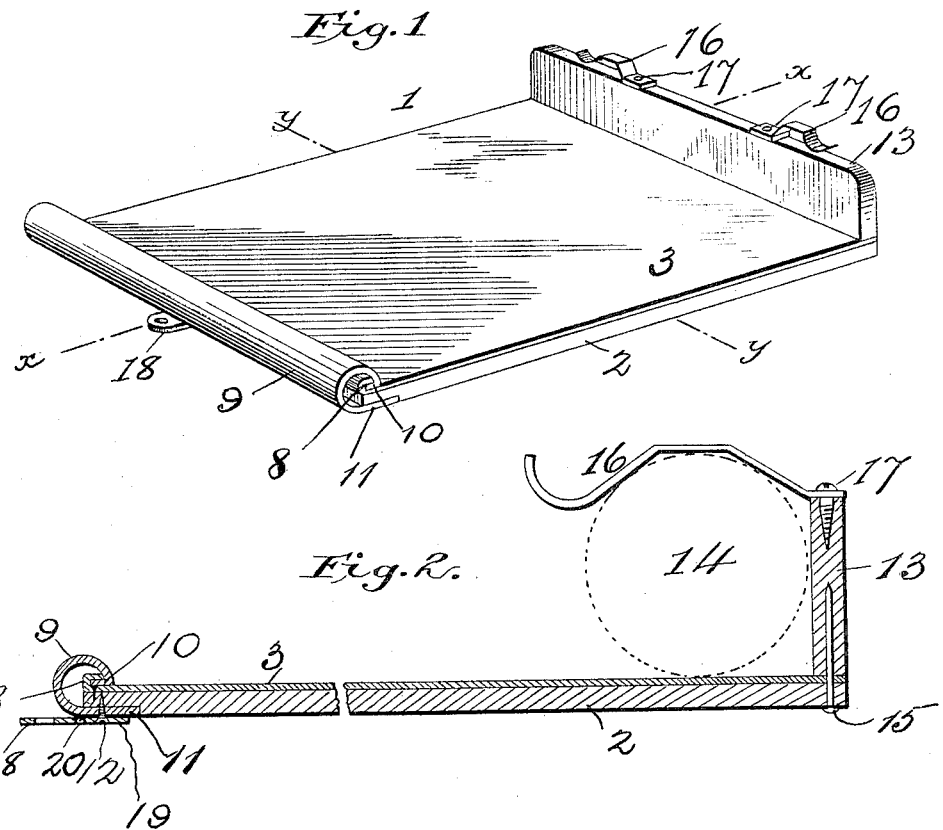
WITNESSES
A. B. Driggs
A. R. Brown
INVENTOR
William Harris
By Chas. J. Gooch
his Attorney
THE NORRIS PETERS CO., PHOTO-LITHO., WASHINGTON, D. C.

UNITED STATES PATENT OFFICE.

WILLIAM HARRIS, OF CAMBRIDGE, OHIO, ASSIGNOR OF ONE-HALF TO JOHN CLINGAN BECKETT AND CHARLES LUTELLUS CAMPBELL, OF SAME PLACE.

BREAD AND PASTRY BOARD.

SPECIFICATION forming part of Letters Patent No. 599,447, dated February 22, 1898.

Application filed May 29, 1897. Serial No. 638,721. (No model.)

*To all whom it may concern:*

Be it known that I, WILLIAM HARRIS, a citizen of the United States, residing at Cambridge, in the county of Guernsey and State of Ohio, have invented certain new and useful Improvements in Bread and Pastry Boards; and I do hereby declare the following to be a full, clear, and exact description of the invention, such as will enable others skilled in the art to which it appertains to make and use the same.

This invention relates to improvements in the construction of bread and pastry boards.

Briefly stated, my improved board, on which dough may be mixed, kneaded, and rolled in the preparation of bread, pastry, and the like, comprises a base composed of one or more sections of wood, wood or straw pulp, or similar material, a metallic top surface having flanged or lipped edges to embrace the side edges of the base, a right-angled head-piece, rolling-pin, keepers pivoted to said head-piece, and a curved bead parallel with the bottom edge of the board, the construction and arrangement of which several features will be hereinafter specifically set forth.

In the drawings, Figure 1 represents a perspective view of my improved bread and pastry board. Fig. 2 represents a longitudinal section thereof on the line *x x* of Fig. 1. Fig. 3 represents a transverse section on the line *y y* of Fig. 1. Fig. 4 represents a sectional detail view of a modification.

The object of my invention is to produce an improved board whereon dough for the formation of bread, pastry, and similar articles of food may be mixed, kneaded, and rolled with greater ease and facility and with greater cleanliness and less waste of material than where wood-surfaced boards are employed.

My improved board also presents additional advantages in the provision of top and bottom stops, confining the flour and dough to the board, and in affording adjustable means for securing the rolling-pin when out of use.

A metallic-surfaced dough mixing, kneading, and rolling board has certain advantages over a board having a wooden or other absorbent upper surface. It is non-absorbent and therefore can be maintained in a sweet and clean condition by simply wiping it after use with a damp cloth. Dough will not adhere thereto, but can be more readily manipulated, can be more smoothly rolled, and will not absorb odors from the previous use of the board, which is often the case where wooden-surfaced boards are used.

1 represents my improved board.

2 represents the base, which may be formed, as shown, either of a single piece of wood or of straw or pulp board, or other suitable material, or of one or more sections thereof grooved, glued, or otherwise connected together.

3 represents the surface on which the dough is manipulated. This surface may be of any suitable sheet metal or alloy thereof and may be either plain, enameled, plated, or otherwise coated as individually preferred. The side edges of this sheet-metal-base sheathing 3 are formed with lips or flanges which, as shown at 4, may be of substantially U shape in cross-section to constitute grooves or pockets 5, within which the base 2 may be slid to frictionally bind said base and sheathing compactly together, or, as shown at 6, said flanges or lips may be simply right-angled to embrace simply the side edges of the base instead of both the side edges and bottom of the base 2, as at 4 5. 7 represents brads, screws, or nails connecting said lipped or flanged portions and the base 2 together.

8 represents a returned lip or flange formed on the bottom edge of the top sheathing 3, and 9 represents a curved bead having a lip or flange 10, which, as shown, lockingly engages with said lip or flange 8, said bead 9 extending, as shown, across the bottom of the board and upwardly thereof, and also around its bottom edge in a curvilinear direction and embracing the bottom of the base at 11, where it is connected to said base by any suitable means, as by brads 12, nails, screws, or the like. The function of this bottom bead 9 is to serve as a stop to prevent the flour and dough under manipulation slipping off the bottom edge of the board. While I prefer to construct this curved bead 9 of metal, it may without departing from my invention be formed of any other suitable material.

13 represents the head-piece. This may be of wood, metal, or any other suitable material, and may have advertising or other matter applied thereto, if desired. The function of this head-piece is threefold. It serves as a stop to retain the flour and dough in position and prevent the same dropping off at the head of the board. It also serves to prevent the warping of the base and also as a rest for the rolling-pin 14 when out of use, as shown in Fig. 2. Said head-piece, sheathing, and base are firmly secured together by nails, screws, or similar devices 15, such connection and arrangement preventing the warping of either the base or the head-piece.

16 represents spring-clips or keepers, which are pivotally secured by screws or the like 17 to the top edge of the head-piece 13. These spring-clips or keepers 16, when the board is being used, are turned on their pivots so as to lie parallel with the top edge of the head-piece, as shown in Fig. 1, thus placing them out of the way of the rolling-pin 14 while the latter is in use. When said spring-clips are drawn out, as shown in Fig. 2, by pressing the rolling-pin against their front ends they will, by reason of their flexibility, give to such pressure and admit of said rolling-pin being pressed into the position shown in Fig. 2 and clamped therein by said spring-clasps. When it is desired to release said rolling-pin, it is simply drawn away from said spring-clasps, which will readily yield to such draft, and said clasps are then turned parallel with the head-piece and out of the way.

18 represents a hanger by means of which the board may be suspended when out of use. This may be of any approved construction, but preferably has hinge or pivotal connection with a lug or strip 19, secured to the under face of the bead, as shown.

It is preferred that the under surface of the base be recessed at those portions where the flanges of the sheathing and the bottom flange of the curved bead come in order that such portions may be received therein and thereby present a continuous surface as the bottom of the base.

Having thus described my invention, what I claim, and desire to secure by Letters Patent, is—

1. A bread and pastry board consisting of a base, a sheet-metal sheathing covering the upper face of said base and having depending side lips or flanges clasping the side edges of said base, a head-piece extending at right angles from said base and removably secured thereto, and a curved bead extending across the bottom of the upper face of the board and around its bottom edge, substantially as and for the purpose set forth.

2. A bread and pastry board having at its lower edge a curved bead extending in raised position across the lower portion of the face of the board and around the bottom edge thereof, substantially as and for the purpose set forth.

3. A bread and pastry board consisting of a base, a sheet-metal sheathing covering the upper surface thereof and having flanged or lipped side edges depending therefrom to embrace the side edges of said base, a curved bead extending in raised position across the lower portion of the face of the board and around the bottom edge thereof, an upwardly-extending head-piece and one or more spring-clips or keepers pivotally secured to the upper edge of said head-piece and adapted to be swung at right angles to and parallel with said head-piece, substantially as and for the purpose set forth.

4. A bread and pastry board consisting of a base, a sheet-metal sheathing covering the upper face of said base and having at its lower edge a returned lip or flange, a curved bead located at the lower end of the board and having at its upper portion a curved flange or lip to engage with the lip or flange on said sheathing, said bead extending around the lower edge of the board and having a lip or flange to engage the under face of the base, substantially as and for the purpose set forth.

In testimony whereof I affix my signature in presence of two witnesses.

WILLIAM HARRIS.

Witnesses:
I. E. HARRIS,
JOHN HARRIS,